United States Patent [19]

Morgan

[11] Patent Number: 5,046,851
[45] Date of Patent: Sep. 10, 1991

[54] POSITION SENSING METHOD AND APPARATUS

[75] Inventor: Colin G. Morgan, Oxford, United Kingdom

[73] Assignee: Davy McKee (Poole) Limited, England

[21] Appl. No.: 411,461

[22] PCT Filed: Mar. 11, 1988

[86] PCT No.: PCT/GB88/00194
§ 371 Date: Sep. 15, 1989
§ 102(e) Date: Sep. 15, 1989

[87] PCT Pub. No.: WO88/07173
PCT Pub. Date: Sep. 22, 1988

[30] Foreign Application Priority Data

Mar. 18, 1987 [GB] United Kingdom ............... 8706388

[51] Int. Cl.[5] ...................... G01B 11/14; B23P 21/00
[52] U.S. Cl. .................................... 356/375; 29/720
[58] Field of Search ............... 356/376, 375; 29/709, 29/720

[56] References Cited

U.S. PATENT DOCUMENTS

| 3,147,384 | 9/1964 | Fenton et al. | 356/375 |
| 4,741,621 | 5/1988 | Toft et al. | 356/376 |
| 4,794,262 | 12/1988 | Sato et al. | 356/376 |
| 4,852,237 | 8/1989 | Tradt et al. | 29/709 |

FOREIGN PATENT DOCUMENTS

| 0132200 | 7/1984 | European Pat. Off. |
| 0143012 | 8/1984 | European Pat. Off. |
| 3242532 | 7/1989 | Fed. Rep. of Germany |
| 2504685 | 10/1982 | France |
| 86/04676 | 8/1986 | Int'l Pat. Institute |
| 59-164973 | 9/1984 | Japan |
| 59-220471 | 12/1984 | Japan |
| 61-223505 | 10/1986 | Japan |

OTHER PUBLICATIONS

Internal Report, Colin Morgan, 20th Oct. 1986, "Visit to Kuka..."(5 Pages).

Primary Examiner—F. L. Evans
Assistant Examiner—K. P. Hantis
Attorney, Agent, or Firm—Robert F. O'Connell

[57] ABSTRACT

A fan beam of light from a source (L) is directed across the edge of a car body window frame section (10) with an external reflective corner (11) and an internal reflective corner (12). The corners reflect sharp spots of light (S1) and (S2) respectively into a detector (D) which produces an output waveform (FIG. 2) in which sharp pulses (P1, P2) correspond to the spots of light. It is easy to discriminate against other pulses (P3) arising from stray reflections, e.g. the multiple reflection (13, R3). The positions of the pulses (P1 and P2) enable the positions of the corners to be calculated. Two detectors and/or or two light sources may be used to increase the amount of data available so as to allow a complete solution for the coordinates of the centers of curvature (C1, C2) of the corners relative to the detectors and the radii of curvature of the corners.

17 Claims, 8 Drawing Sheets

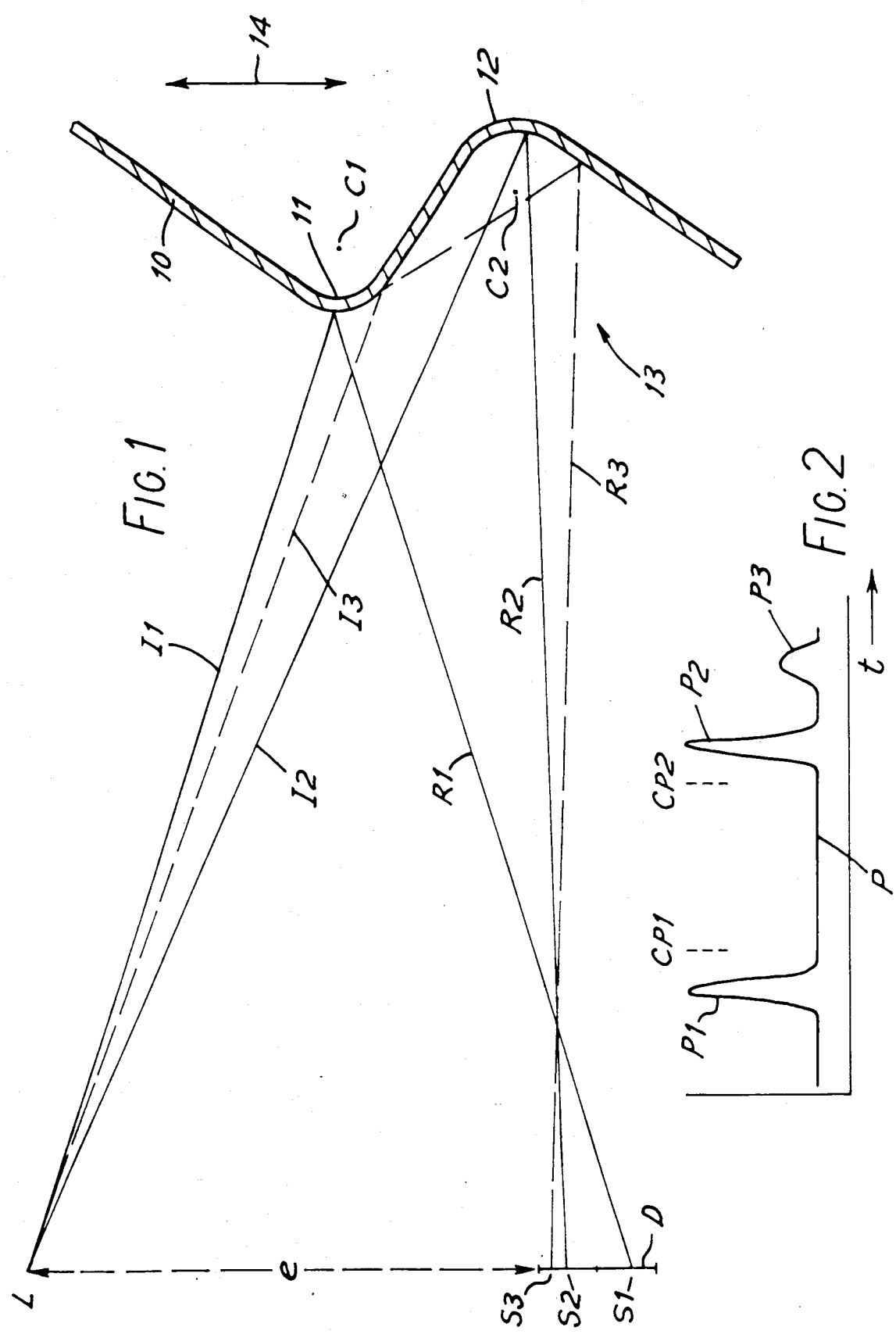

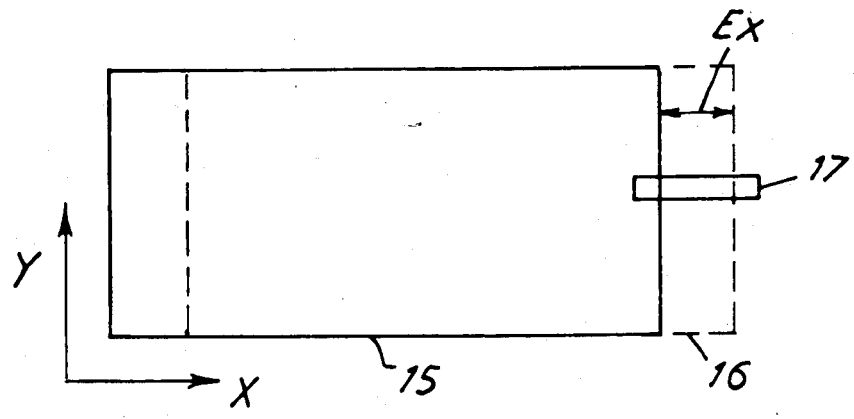
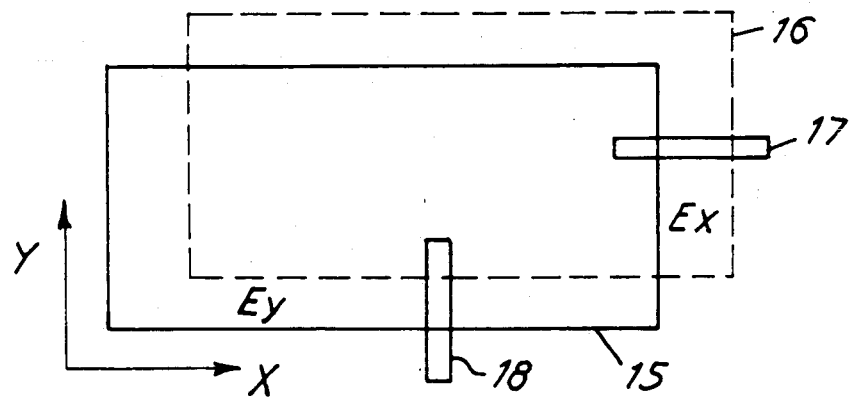
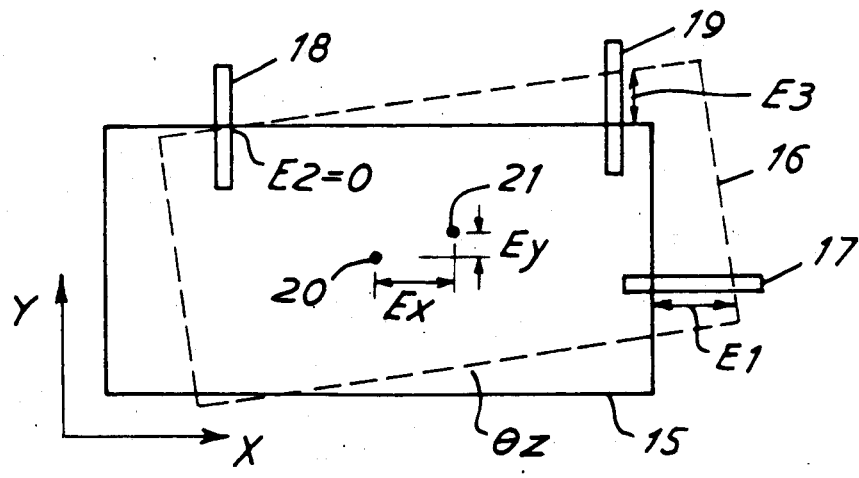

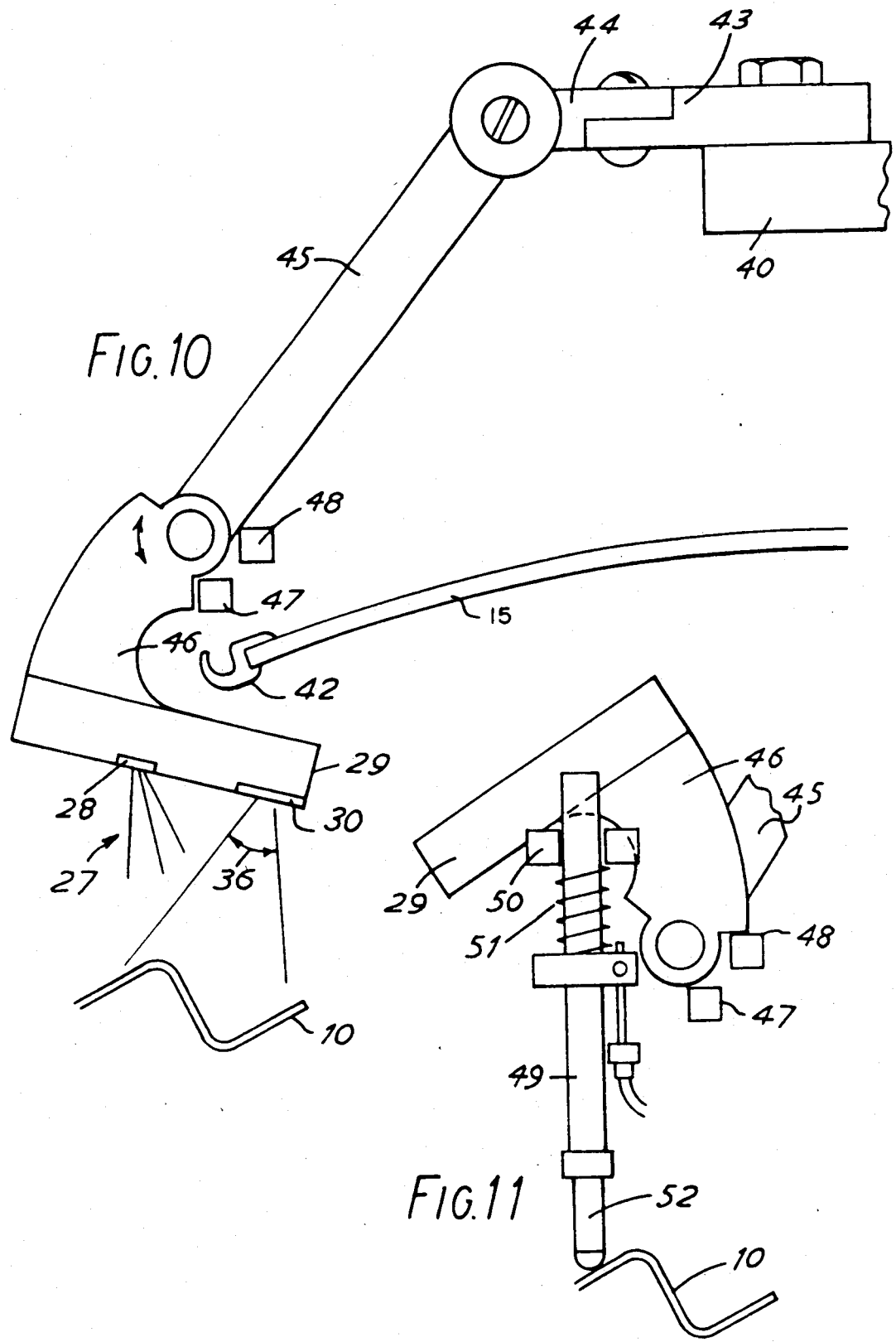

POSITION SENSING METHOD AND APPARATUS

The present invention relates to a method of sensing the position of a reflecting, rounded corner using an electro-optical device.

One example of considerable interest is a corner of the frame section around a window opening in a car body. Attempts are being made to automate the insertion of windscreens and other car windows. A robot picks up the window, using suction cups on a lifting frame, and pushes it into the window opening. Adhesive has already been run round the edge of the window (or possibly the frame section). A plastic trim may be carried on the window or be pre-fitted in the frame section. A significant problem is that a car body on a production line is only positioned within rather loose tolerances, say ±40 mm, and yet the window must be positioned correctly, to better than 1mm relative to the window opening, before the robot pushes the window in. Misalignment leads to spectacular but costly results.

It is known to determine the position of the window opening using four or more fixed cameras in conjunction with a powerful image analysis computer. Such a system is very expensive, requires elaborate set-up procedures and is too easily upset by deviations from ideal conditions. It is also known to attach simple source-detector sensors to the lifting frame itself (e.g. light emitting and light sensitive diode pairs) and to move the lifting frame in two dimensions until detected edge transitions indicate that the window is in the right position. This system is simple and cheap but very slow. The lifting frame has to be moved about by the robot for about 15s before the correct position is reliably determined.

Electro-optical position sensors such as diode pairs generally sense whether or not an object is present by the presence or absence of diffused light returning from the object. Thus there are many known electro-optical devices used for sensing profiles, generally employing a scanning beam and a sensor which detects back-scattered light (e.g. EP-A2-0 137 517, EP-A1-0 163 347, GB 1 379 769 and GB-A 2 001 753). EP-A1-0 132 200 discloses a device which detects edges and gaps between edges but which again relies upon scattered light. None of these devices is suitable for use when the object is a reflecting, rounded corner.

Other known devices do sense specularly reflected light (e.g. WO86/04676 for sensing angle of inclination of a scanned surface, EP-A-0 143 012 for determining spatial coordinates, using a rotating laser beam). These devices are neither intended for nor suitable for sensing the position of a corner.

The object of the present invention is to provide an improved but simple method of sensing the position of a reflecting, rounded corner.

According to the invention there is provided a method of sensing the position of a reflecting, rounded corner using an electro-optical sensing device, characterized in that the device comprises a light source providing a fan beam of light orientated across the corner and a light detector which specifies the position of a reflecting object as a position along a scale referenced to the optical device, the positions of the source and detector being such that a relatively large amount of the light reaching the detector is light reflected from a narrow stripe extending along the corner.

The term "light" is not intended to restrict the invention to use of visible light. Infra-red light could be used for example.

It is greatly preferred in the present invention to use, as stated above, a fan beam of light, in contrast to the scanning beams which are essential in most if not all of the references mentioned above. Such a beam can be generated very simply using static components such as a slit aperture and/or a cylindrical lens whereas a scanning beam requires more complex optics, e.g. a rotating mirror. Nevertheless, a fan beam, can be simulated by a scanning pencil beam and this is used in a non-preferred modification of the method of the invention.

The invention further relates to automatic assembly apparatus for fitting a component to an object having rounded, reflecting corners. While the invention is defined with particularity in the appended claims, the underlying principle is that, using an electro-optical device it is possible to determine the position of a rounded corner because, within the field of view of the device, the corner is observed due to its narrow reflecting stripe-shaped reg. The way in which this arises will be described, in conjunction with various embodiments of the invention, (given by way of example) with reference to the accompanying drawings, in which FIG. 1 is an explanatory diagram, FIG. 1A illustrates some of the optical considerations applying to FIG. 1, FIG. 2 shows a detector response waveform, FIGS. 3 to 5 are more explanatory diagrams, FIGS. 6, 7 and 8 are plan, side elevation and end elevation views respectively of an electro-optical device, FIG. 9 shows four of these devices used in conjunction with a windscreen lifting frame, FIG. 10 shows how one device may be mounted on the frame, FIG. 11 shows a mechanism for retracting a device, FIG. 12 is an explanatory diagram illustrating the way in which detector pulse width varies, FIG. 13 is a diagram of apparatus with a two-sensor device.

Figures 1A, 1B:
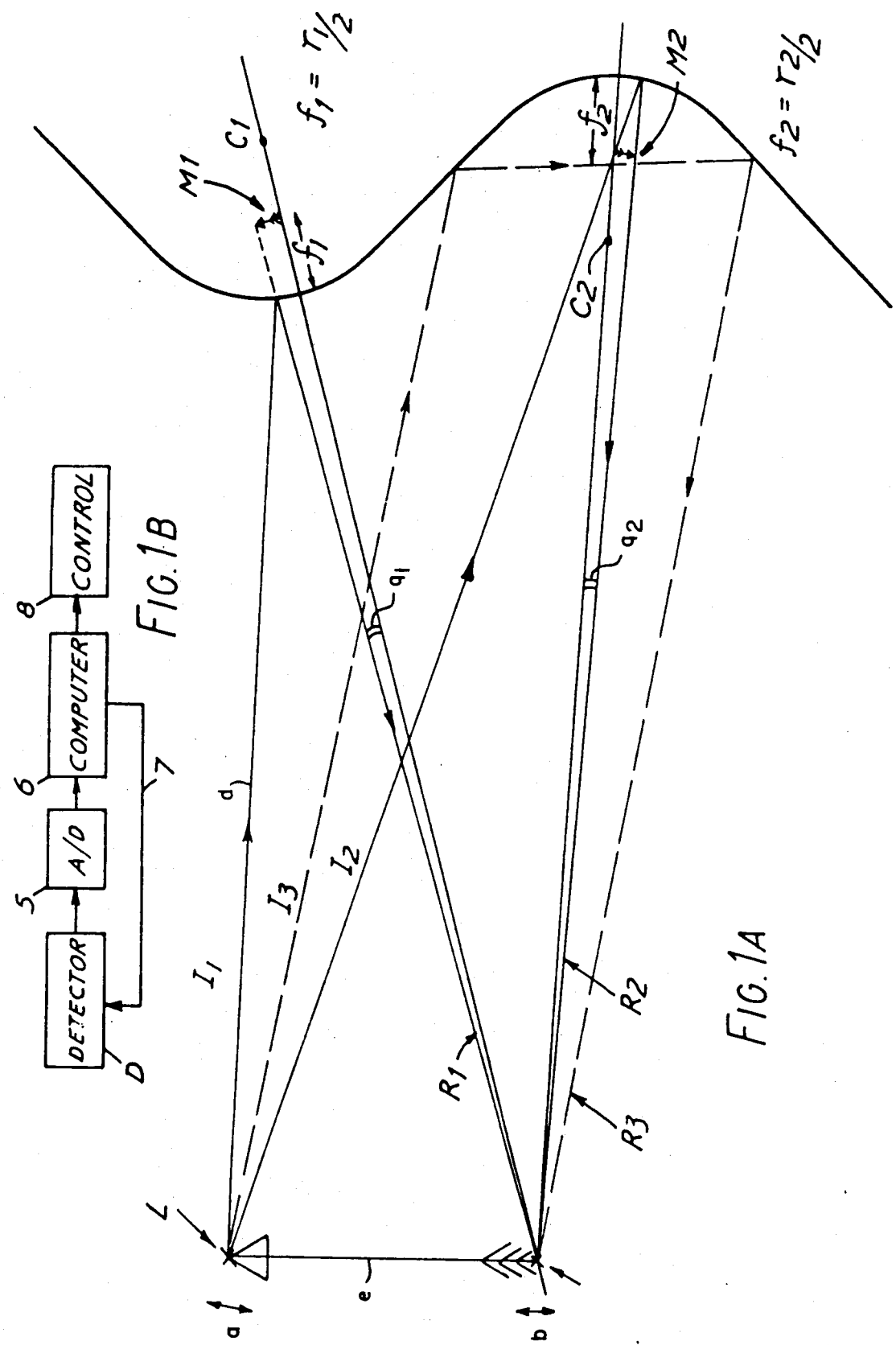

FIG. 1 shows a typical frame section 10 around a window opening in a car body, with an external corner 11, and an internal corner 12 forming a rebate for the reception of a window. The body will have been painted before the window is fitted and may be white, black or any of a range of dark and light colours, including metallic finishes. The finish will nevertheless always be of a strongly reflective nature, rather than a matt, diffusive nature. The corners 11 and 12 may have radii of curvature of typically 1 to 2 mm.

A light source L directs a fan beam of light towards the frame section 10 and a sensor or detector D receives reflected light. The fan beam is orientated across the corner. The detector is of well known type providing an output waveform (FIG. 2) in which pulses represent the positions along a detector scale of beams incident upon the detector and hence, in the present case, the positions of reflecting objects. A preferred detector is described below with references to FIGS. 6 to 8. Some incident and specularly reflected rays are shown. An incident ray I1 produces a reflected light stripe-shaped region at the corner 11 and the reflected ray R1 strikes the detector at S1. Likewise an incident ray I2 produces a reflected light striped-shaped region at the corner 12 and the reflected ray R2 strikes the detector at S2. The waveform obtained from the detector D thus exhibits corresponding pulses P1 and P2 which are superimposed on a base signal or pedestal P arising from ambient light and diffused light from the frame section 10. The height of the base signal varies and tends to be higher for lighter paint finishes but the pulses P1 and P2 tend to be so prominent that they can always be detected reliably.

The processing of the pulses P1, P2 to obtain positional information relies upon readily available technology. FIG. 1B shows the detector D connected to an analogue-to-digital converter 5 which provides samples to a computer 6. The computer analyses the samples to locate the pulses P1, P2 and also strobes the detector D (line 7) to synchronise the detector waveform with the real time analysis in the computer. The position data is fed to a controller 8, specifically a robot controller which applies feedback control to a robot carrying the detector, so as to move the detector into a desired position relative to the corners 11, 12.

The position of P1 and P2 in the detector timebase gives a good indication of the position of the frame section 10 relative to the device comprising the source L and detector D in the direction of the arrow 14 in FIG. 1. Clearly, if the frame section is moved down in FIG. 1, the pulses P1 and P2 will move to the right in FIG. 2. However, the derivation of position information is considered more fully below.

For simplicity, FIG. 1 shows a point source L. In practice, the source will have an aperture which will be denoted a and the detector will have an aperture b which will typically be determined by an objective lens. The design of the optics is considered in more detail below.

The stripes producing P1 and P2 are somewhat indeterminately located around the corners 11 and 12. It is possible to apply corrections to bring the pulses P1 and P2 to the positions CP1 and CP2 which they would assume if referenced to the centres of curvature C1 and C2 of the two corners.

The internal and external curved corners each act as a cylindrical mirror "lens" with an effective focal length of $f = r/2$ where $r$ = radius of curvature. FIG. 1A shows the positions of the virtual and real images M1 and M2 created at the two corners (with greatly exaggerated radii) by an object at the sensor. In the limit that the sensor to corner distance d is much greater than the radii r we have the following results (ignoring sign differences in the two cases).

Focal length of corner $$f = r/2$$

Height of image $$h = ef/d = er/2d$$

Width of image of light source $$i = af/d = ar/2d$$

Angular width of light source as seen at the detector $$p = i/d = ar/2d^2$$

Correction angle to apply to image position to give the ray which passes through the centre of curvature $$g = h/d = er/2d^2$$

Where
r = radii of curvature of either corner (typically 1-2 mm)
a = aperture of light source (typically 1-2 mm)
d = sensor to window frame distance (typically 100 mm)
e = lamp to detector separation Substituting typical values into the above equations shows that this technique is capable of generating very fine image pulse widths.

Thus the individual corrections, in terms of angular position (FIG. 1A) are given by $$q_1 = r1/2d = er1/(2d^2)$$

$$q_2 = r2/3d = er2/(2d^2)$$

where r1 and r2 are the radii of curvature of the corners 11 and 12 respectively and, in the angular position domain, $$CP1 = P1 + q_1$$

and $$CP2 = P2 - q_2$$

Whether it is necessary or not to make these corrections will depend upon the required accuracy.

The width of the pulses P1 and P2 varies with the distance from the device to the frame section so that some distance information also can be obtained from analysis of the pulses. Another obvious source of distance information is the spacing between P1 and P2; the corners 11 and 12 will appear closer together the further away they are from the device L,D.

A number of other possibilities exist for specular reflections which can complicate the images.

1. Corner Reflector.

The two side surfaces enclosing the internal corner act as a double mirror corner reflector. FIG. 2 shows a pulse P3 created by an incident ray I3 and reflected ray R3 striking the detector at S3 in FIG. 1. The position and shape of the pulse in the image depends upon the choice of lamp and detector separation, the exact angle formed at the corner and the flatness of the sides. The image P3 can occur on either or both sides of P2. The worst case situation occurs where the detector to lamp separation is small. The amplitude of this signal can be reduced by using a polarised light source (electric vector in plane of diagram) and arranging for the light to strike either surface at the Brewster angle. The strength of the reflected signal in this situation is greatly reduced.

2. Multiple Reflection.

For best results the detector should be designed to respond to the uncertainty in angle for a particular application, but no more. Stray light entering the detector may degrade the image quality. A number of techniques can be employed to minimise such effects.

1. Interference filters/lasers

Using a laser diode as a near monochromatic light source in conjunction with a tuned narrow band pass interference filter in front of the detector will eliminate the majority of the stray light.

2. Differencing signals

Capturing 2 images, with and without the light source on, and differencing the signals allows stray light signals to be cancelled out.

Examples of use of the invention will now be considered with reference to FIGS. 3 to 5, in which a windscreen is symbolized by a rectangle 15 and the frame into which it is to go by a broken line rectangle 16. The X axis horizontal, the Y axis is perpendicular to the X axis, in the plane of the windscreen, and the Z axis is perpendicular to the paper. For clarity errors are exaggerated.

FIG. 3 shows a very simple case in which only X-axis misalignment has to be considered. A single sensor 17 will indicate the X-axis error Ex and can provide a control signal to a robot to cause it to shift the windscreen 15 to the right to eliminate the error Ex. It should be emphasized that this can be done with a conventional robot which does not require any modification in itself.

FIG. 4 illustrates the case in which both X-axis and Y-axis errors are possible. Two sensors 17 and 18 are required to determine the X-axis and Y-axis errors Ex and Ey.

FIG. 5 illustrates a more general case in which there may also be a rotational error about the Z axis. Three sensors 17, 18 and 19 are now provided and yield errors E1, E2 and E3 from which it is a trivial exercise in trigonometry to determine the Ex, Ey and $\theta z$ corrections to be applied to the robot, where $\theta z$ represents the rotational error about the Z axis and Ex and Ey are as measured between the centre 20 of the window and the centre 21 of the frame.

In a still more general case, Z-axis information is used to determine errors $\theta x$ and $\theta y$, i.e. tilts about the X and Y axes. If three signals Dx, Dy and Dx are obtained as explained above from pulse widths or pulse spacing (or stereoscopically as explained below) to give the spacing to the frame 16 from the devices 17, 18 and 19, it can be seen that $\theta x = \theta y = 0$ if Dx, Dy and Dz are all equal. If they are not equal, it is again a matter of elementary trigonometry to determine $\theta x$ and $\theta y$ and derive the corresponding correcting signals for the robot. Indeed, it is a particular advantage of the invention that, even in the case of full 6-axis control, the calculations necessary to determine the correction signals for the robot are within the capabilities of a relatively inexpensive personal computer, which can moreover handle the calculations rapidly enough for real time control.

Figure 6:
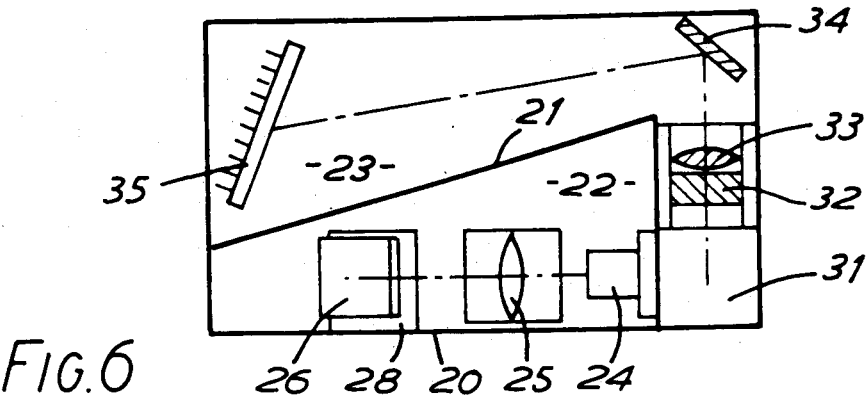
Figure 7:
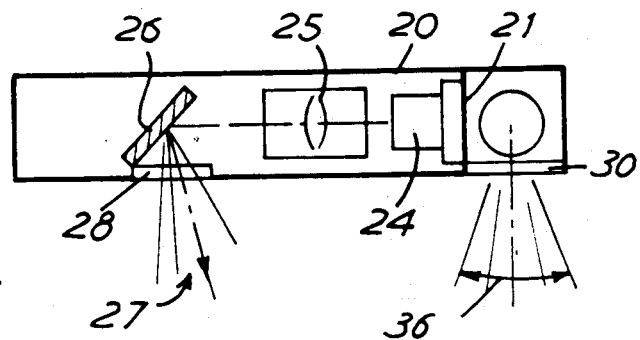
Figure 8:
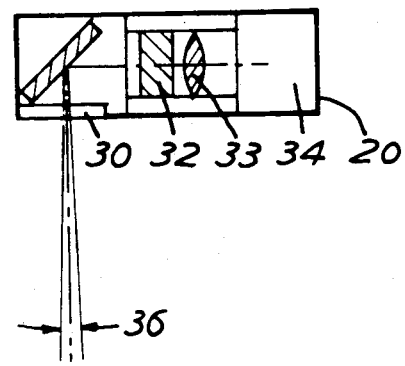

A practical form of electro-optical device 29 will now be described with reference to FIGS. 6 to 8. A light box 20 is divided by a partition 21 into a source compartment 22 and a detector compartment 23. Within the source department, a laser diode 24, cylindrical lens 25 and mirror 26 direct a fan-shaped beam 27 out of a window 28 in the bottom of the box. Reflected light enters the detector compartments 23 through another window 30, is directed by a mirror 31 through a filter 32 and adjustable focus objective lens 33 and is then directed by another mirror 34 on to a linear array detector 35 which is skewed at such an angle that the images from both corners can be brought into focus simultaneously despite their differing distances from the detector.

The field of view 36 of the detector is that of a narrow, fan-shaped beam and the device 29 is so positioned that the wide dimension of the beam is across the corners to be sensed.

Figure 9:
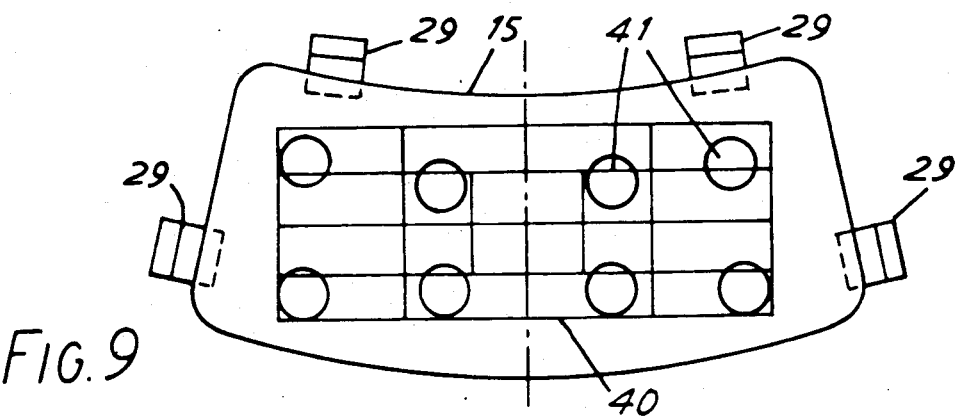

FIG. 9 shows how four of the devices 29 may be mounted relative to a lifting frame 40 with say eight suction cups 41 for carrying a windscreen 15. Although only three devices 29 could in theory be used (cf. FIG.5) four are provided, because of the variations in car body size which occur in practice. The width of the bodies can vary by as much as 1 cm. By providing symmetrical left and right sensors 29 at the sides of the window, it becomes possible to centre the window in the opening and make the adhesive-filled gaps at the two sides equal. Moreover four devices provide some redundant data so that consistency checks can be included in the computations and a warning can be given if there is inconsistency.

FIG. 10 shows a fragment of the lifting frame 40 and a fragment of a windscreen 15 with a plastic trim 42 round its edge. The device 29 is supported from a bracket 43 bolted to the frame 40 by way of two adjustable arms 44,45 which enable the device to be adjusted to and fixed in a suitable position. The device 29 is fixed to a bracket 46 which is pivoted to the distal end of the arm 45 to allow the device 29 to be swung from the illustrated position, in which it is in front of the windscreen so that it can view the frame section 10, to a retracted position in which it will not impede the advance of the windscreen into the frame. The two positions are defined by stops 47 and 48 fixed relative to the arm 45 (by means not shown).

The stops may be provided with limit switches to assist in the automatic control sequence. Thus all brackets 46 must be against their stops 47 before position sensing is effected. At a later stage, as the windscreen is offered up to the frame, the brackets 46 must all be against their stops 48 if it is to be safe to continue to push the windscreen into the frame.

FIG. 11 shows the device 29 and its bracket 46 in the retracted position and a push-rod 49 which effects the retraction. The push-rod is guided in a further bracket 50 attached to the arm 45 and coupled to the bracket 46 by means (not shown) such as a rack attached to the rod 49 meshing with a pinion attached to the bracket 46. When the push-rod engages the frame section 10, it is forced back against the action of a spring 51 and thereby swings the bracket 46 and device 29 clear, until the bracket engages the stop 48. Since the lifting frame 40 has still to advance further, the push-rod 49 has a retractable plunged 52 which then retracts against the force of another spring inside the rod 49 and more powerful than the spring 51.

Figure 12:
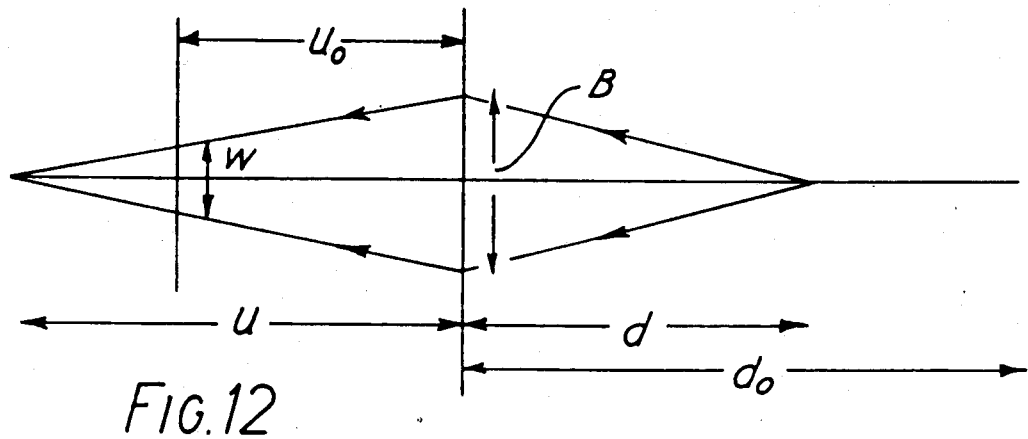

It may not be possible to generate both P1 and P2 (FIG. 2) because the internal corner 12 has had trim fitted into it. It is not then possible to measure the distance d by the P1-P2 pulse spacing. A measurement based on pulse width is difficult to interpret reliably. A wider image results essentially because the image is out of focus when the distancd d does not fit the lens equation at the detector. If the nominal observation distance is $d_o$ and the detector objective has a focal length f and a lens-to-detector array distance of $u_o$, then $1/u_o + 1/d_o = 1/f$. For any other distance d we have $1/u + 1/d = 1/f$ and a point image assumes a width $w = (B/u)ABS(u - u_o)$ where B is the lens aperture, (see FIG. 12). Moreover it is difficult to measure pulse width because of the variable base signal P on which the pulse is superimposed. It is therefore preferred to measure d by providing two laterally spaced detectors D and applying conventional stereoscopic techniques. The necessary calculations are again well within the routine capabilities of a typical 16-bit personal computer.

Position Information can be obtained by two triangulation techniques.

1. Using Stereo Detectors.

Using 2 separated detectors to give a stereo pair of images of the same feature, preferably the image stripe from the external corner.

2. Using Two Image Features.

Using a single detector, but identifying two image features, corresponding to the two corners, and making use of the known dimensions of the window frame and direction of observation.

Method 2 has been described in some detail. The particular Optical arrangement shown was chosen to minimise the thickness of the sensor, in order to give easier access to view the window frame from under the glass.

Figure 13:
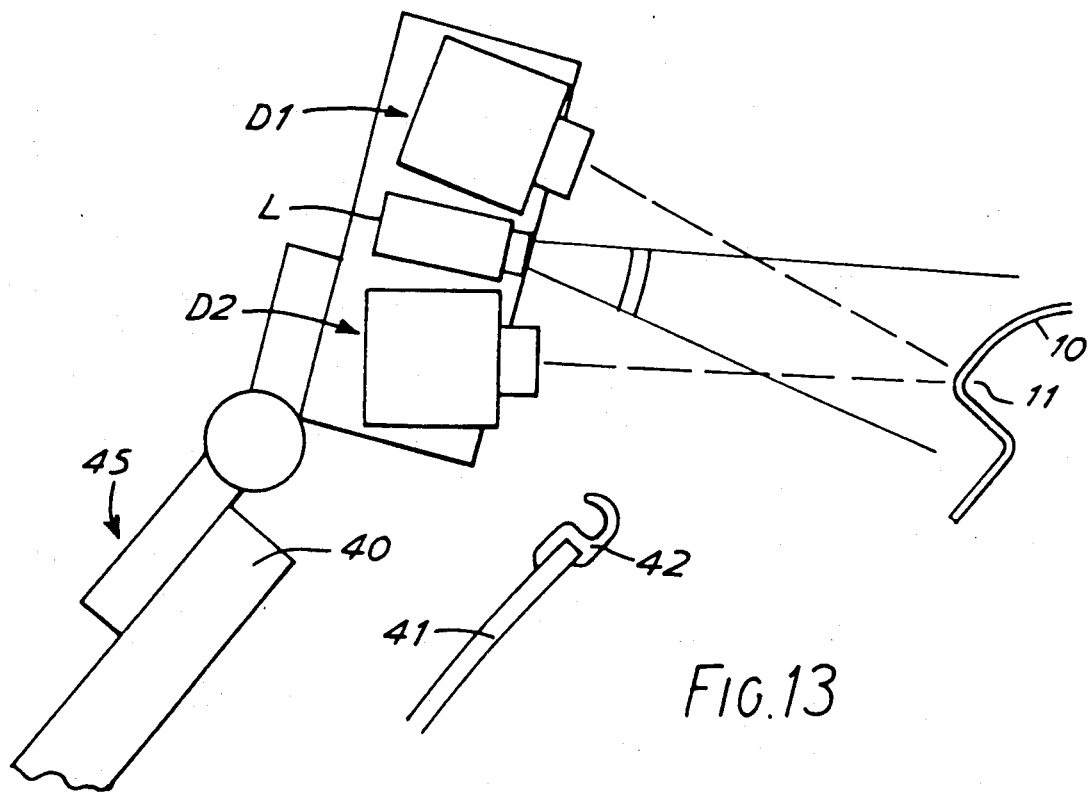

Method 1, however, appears to be the preferred technique. This has the advantage of only making use of the external corner for measurements. The internal corner is sometimes obscured and is more likely to be confused by the other specular reflections described above. This method also simplifies the sensor access problems. In general no retraction mechanisms are needed. It should be possible to attach the sensors to the lifting framework so that they are positioned above the glass but still be able to observe the external corner. This is helped in the case of the two side mounted sensors by the curvature of the windscreen. In the case of the two top mounted sensors, it may be necessary to choose the reference measuring position displaced downwards a small distance. FIG. 13 shows the use of a stereo device with two spaced detectors D1, D2 flanking a single light source L.

Range information is preferably computed by triangulation techniques as described above. It is possible however to obtain some depth information by measuring the width of the image pulses, also described above. A measurement of pulse width can then be used as a cross check against the distance computed from the triangulation data.

In the design of the optics for best angular sensitivity, two conflicting requirements for the aperture of the camera lens may arise. If a greater angular detection range is required, it may be necessary to increase the aperture of the lens. At the same time, in order to maximise the depth of field of the camera and maintain a sharply defined peak depth it is desirable to minimize the lens aperture. The solution to these conflicting requirements is to replace the conventional circular aperture (assumed in FIGS. 6 to 8) by a slit aperture such that the wide dimension is perpendicular to the plane of the detector.

Figure 14A:
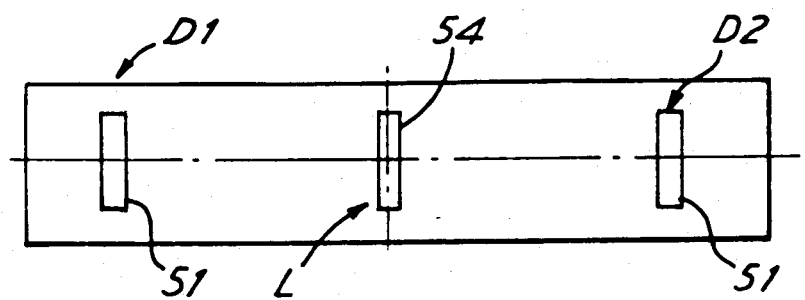
FIGS. 14A and 14B are diagrams of a two-detector device with improved optics.
Figure 14B:
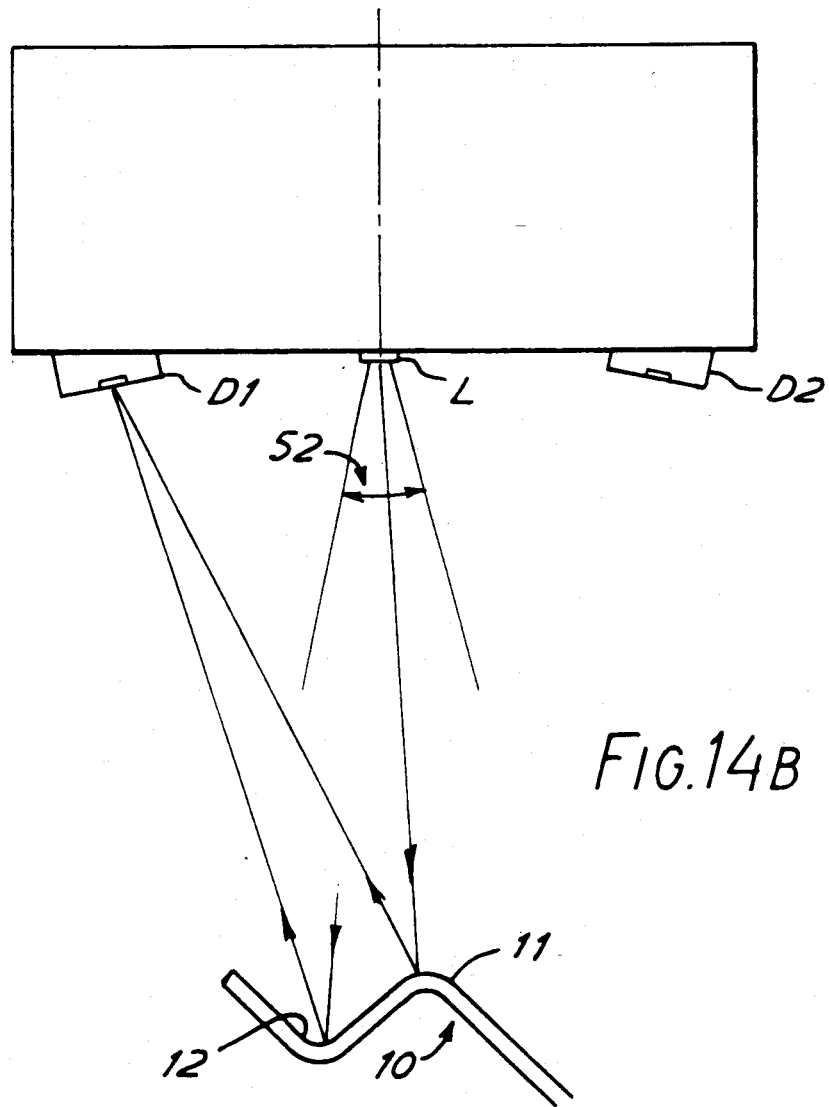

This is illustrated in FIGS. 14A and 14B for the type of stereoscopic device utilized in FIG. 13. The two detectors D1,D2 (cameras) have slit apertures 51 perpendicular to the plane of the detector, i.e. the plane containing the fan beam 52 of the light source 53 and containing the detector scale.

In the same way the angular range can be increased by using a light source aperture L with an extended width perpendicular to the pla of the detector (see FIG. 14A). In the limit, a detector with a very wide angular range can be designed by using a long thin light source perpendicular to the plane of the detector and replacing the conventional spherically symmetric camera lens by a cylindrical lenses.

A useful analogy is to compare this system to a "tuned" circuit. The detector is designed to find the required "specular signal" and reject the unwanted "Lambertian" background. With a narrow angular acceptance range the sensor has a high "Q" value, detecting signals over a narrow bandwidth. By increasing the angular range, the "Q" value of the detector is reduced and the bandwidth is increased, leading to a greater contribution from the unwanted background. Clearly the desirable solution is to optimise the optics so as to match the angular acceptance range for detecting the specular signal to the characteristic uncertainties present in the components.

The ultimate refinement is to define both apertures (source and detector) by crossed pairs of cylindrical lenses, whereby it is possible to determine separately the apertures perpendicular to and in the detection plane.

Figure 15:
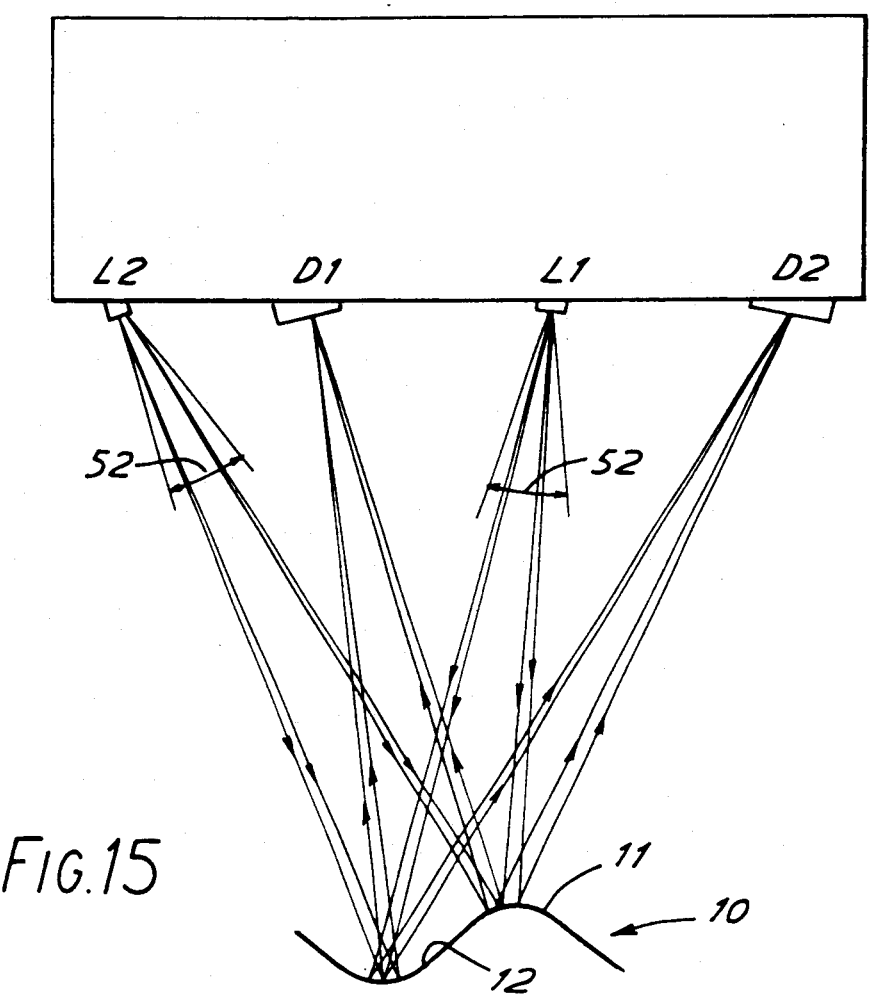
FIG. 15 is a diagram of a device with two detectors and two light sources.
Figure 16:
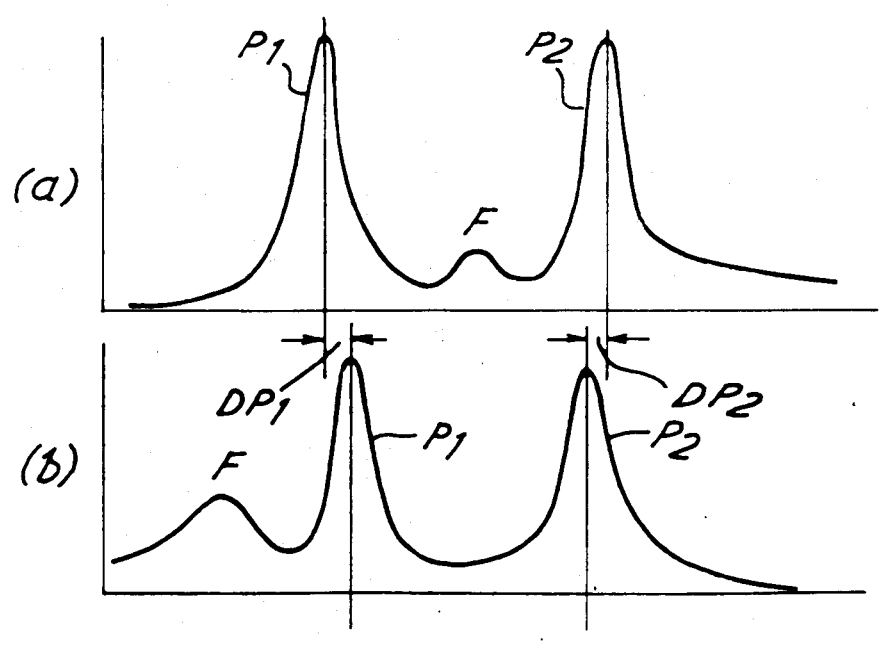
FIG. 16 shows waveforms obtained with the device of FIG. 15.

One problem that has been identified with windscreen insertion is the variation in the component radius of curvature that occurs as the press tools wear. The situation can arise where a mix of car bodies produced from different press tools are present on the same production line. In order to correct the peak positions in the manner explained with reference to FIG. 1A it becomes necessary either to identify the origin of each body or alternatively measure the radius directly. This second approach can be done with a simple modification to the detector. FIG. 15 shows a stereographic detector to which a second light source L2 has been added. If now (for each camera D1, D2), two images are captured, one with each of the two light sources L1, L2, and compared, it will be seen that the images will be very similar but the peaks will be displaced by a small amount because of the difference in position of the two light sources. The two sources can be turned on alternately to facilitate this. FIG. 16 shows waveform (a) as in FIG. 2 for one of the detectors, say D1, of FIG. 15 responding to light from the source L1 and producing peaks P1 and P2 from the external and internal corners 11 and 12 respectively. A false peak F arises from a multiple reflection. Waveform (b) shows the response of the same detector but using the source L2. The peaks P1 and P2 have moved in towards each other by small amounts DP1 and DP2 respectively but the false peak F has moved to a totally different position. It is a simple computational exercise in geometrical optics to determine from the responses (a) and (b) and the corresponding responses from the detector D2 the complete geometry in the plane of the detector, namely the coordinates of C1 and C2 and the radii of curvature r1 and r2. By measuring this shift in the peak positions, the radius of curvature can be found. The equations for $9_1$ and $9_2$ give the shift in peak position as a function of the radius of curvature. As the two light sources are at a known separation, it is possible to solve for the radius.

This modification has other advantages. The direction of the shift in peak position indicates not only the radius but also the sign, i.e. it distinguishes peaks resulting from internal and external corners. This information can be useful in resolving ambiguities in the image interpretation.

This procedure can also help distinguish between "true" peaks and "false" peaks that sometimes arise from the multiple reflection situations described above with reference to FIG. 1. These "false" peaks are sensitive to the position of the light source and will in general be totally different in the two images, whereas the true peaks will be very similar but slightly displaced from each other.

The sensor has also shown itself capable of detecting objects of quite large radii of curvature. In this case however, the equations given for correcting peak position for small radii components are no longer valid and the full lens formulae will need to be solved.

There is nothing special in this invention in the use of a laser light source except that it is convenient, small and its monochromatic nature makes it easy to filter out background light.

The method according to the invention can be used in a gauging tool, attached to a robot to make a series of measurements on car bodies.

I claim:

1. A method of sensing the position of a specularly reflecting, rounded corner of a strongly reflecting object, the method comprising:
    providing an electro-optical sensing device, said sensing device comprising light source means for providing a single static fan beam of light, and light detector means;
    said light source means being operative to provide a fan beam of light orientated across the rounded corner of the reflecting object;
    said source means and said detector means being positioned such that a relatively large amount of the light reaching said detector means is light reflected from a narrow stripe-shaped region of said object extending along said corner; and
    determining with said detector means the amount of light reflected from said object along a linear scale of positions defined relative to the direction of alignment between said source means and said detector means.

2. A method according to claim 1, characterized in that the position along the scale is corrected to relate the position to the centre of curvature of the corner.

3. A method according to claim 1 or 2, characterized in that the detector means is of the type providing an output waveform in which the position of a pulse relative to a timebase represents the position of a reflecting object.

4. A method according to claim 3, characterized in that the pulse has a width and an indication of the device to corner distance is obtained from the width of the pulse corresponding to the light reflected from the said narrow striped-shaped region of said object.

5. A method according to claim 1 or 2, characterized in that the device is set up to observe simultaneously two corners of the same object and the device to object distance is determined from the distance between the positions determined for the two corners.

6. A method according to claim 1 or 2, characterized in that the device comprises two spaced detectors (D1, D2) and the device to corner distance is determined stereoscopically from the positions sensed by the two detectors.

7. A method according to claim 6, characterized in that the device comprises two spaced light sources and the radius of curvature of the corner is determined in dependence upon the displacement between the position of the corner as determined by the detectors in response to the images from the two light sources.

8. A method according to claim 1, characterized in that the positions of a plurality of reflecting rounded corners distributed over an object are determined by a corresponding plurality of electro-optical sensing devices and the positions are analysed to determine a set of alignment errors between the object and the devices.

9. A method according to claim 8, characterized in that the devices are attached to a component-positioning robot and the alignment errors are applied to effect robot adjustments relative to corresponding degrees of freedom so as to position a component also carried by the robot correctly relative to the object.

10. A method according to claim 9, characterized in that the object is a car body, the corners are distributed round the frame of a window opening in the body and the component is a window to be inserted in the opening by the robot.

11. Apparatus for sensing the position of a specularly reflecting, rounded corner with an electro-optical device, characterised in that the device comprises a light source providing a fan beam of light orientated across the corner, a light detector positioned to receive light specularly reflected from the corner, the light detector being of a kind producing an output waveform in which the position of a pulse indicates the position along a linear scale, and computing means responsive to the output waveform to compute a position of the corner relative to the detector and in a detector plane established by the fan beam.

12. Apparatus according to claim 11, characterized in that there are two detectors spaced in the detector plane, and in that the computing means respond to the output waveforms from both detectors to compute the position of the corner (11, 12).

13. Apparatus according to claim 11 or 12, characterized in that there are two light sources spaced in the detector plane, and in that the computing means respond to the output waveforms from at least one detector corresponding to both light sources.

14. Automatic assembly apparatus for fitting a component to an object having rounded specularly reflecting corners, comprising a robot with a head for holding the component and programmed to pick up the component in a fixed position relative to the head and move it to a nominal datum position relative to the object, at least one electro-optical device mounted on the head to observe one of the corners of the object, said at least one device comprising a light source and a light detector adapted to enable the position of a reflecting object to be specified as a position along a scale referenced to a direction of alignment of said source and said detector, characterized in that the light source produces a static fan-shaped beam of light or produces a scanning light beam which scans to provide a static fan-shaped beam of light, in that said scale extends in the direction of the fan-shaped beam and across said one corner, and in that the positions of the source and detector are such that a relatively large amount of the light reaching the detector is light reflected from a narrow stripe-shaped region of said object extending along the corner, and by computing means responsive to signals from said at least one device to compute at least one correction signal, and means applying said at least one correction signal to control a corresponding degree of freedom of the robot so as to bring the component accurately to said datum position before the robot fits the component to the object.

15. Apparatus according to claim 14, characterized in that said at least one device is mounted in front of the component for position sensing and comprising means for retracting said at least one device after said at least one device has provided a signal to the computing means and before the robot fits the component to the object.

16. Apparatus according to claim 14, characterized in that said at least one device comprises two spaced detectors and the computing means determine the position of a corner sensed by said at least one device by triangulation calculations.

17. A method of sensing the position of a specularly reflecting, rounded corner, the method comprising:

providing an electro-optical sensing device, said sensing device comprising light source means of a pencil beam of light, illuminating and linearly scanning said light source means in a plane to provide a static fan beam of light orientated across a rounded corner of the reflecting object;

said source means and said detector means being positioned such that a relatively large amount of light reaching said detector means is light reflected from a narrow stripe-shaped region of said object extending along said corner; and determining with said detector means the amount of light reflected from said object along a linear scale of positions defined relative to the direction of alignment between said source means and said detector means.

* * * * *